(12) United States Patent
Magharei et al.

(10) Patent No.: US 8,898,232 B2
(45) Date of Patent: Nov. 25, 2014

(54) CONTRIBUTION AWARE PEER-TO-PEER LIVE STREAMING SERVICE

(75) Inventors: Nazanin Magharei, Eugene, OR (US); Yang Guo, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 461 days.

(21) Appl. No.: 12/312,319

(22) PCT Filed: Nov. 29, 2006

(86) PCT No.: PCT/US2006/045588
§ 371 (c)(1),
(2), (4) Date: May 5, 2009

(87) PCT Pub. No.: WO2008/066516
PCT Pub. Date: Jun. 5, 2008

(65) Prior Publication Data
US 2010/0030909 A1 Feb. 4, 2010

(51) Int. Cl.
*G06F 15/16* (2006.01)
*H04L 29/08* (2006.01)
*H04L 29/06* (2006.01)

(52) U.S. Cl.
CPC ........ *H04L 67/104* (2013.01); *H04L 29/06027* (2013.01); *H04L 65/4084* (2013.01); *H04L 65/80* (2013.01); *H04L 67/1093* (2013.01); *H04L 67/1046* (2013.01); *H04L 67/1082* (2013.01)
USPC .......................................... 709/204; 709/227

(58) Field of Classification Search
USPC ....................................................... 709/204
See application file for complete search history.

(56) References Cited

U.S. PATENT DOCUMENTS

| 5,859,959 | A | 1/1999 | Kimball et al. | |
|---|---|---|---|---|
| 6,601,101 | B1 | 7/2003 | Lee et al. | |
| 7,454,480 | B2 | 11/2008 | Labio et al. | |
| 7,558,797 | B2 * | 7/2009 | Li | 1/1 |
| 7,593,333 | B2 * | 9/2009 | Li et al. | 370/232 |
| 7,613,770 | B2 * | 11/2009 | Li | 709/203 |
| 7,616,582 | B2 | 11/2009 | Jeffery et al. | |
| 7,729,992 | B2 | 6/2010 | Rose | |
| 7,809,646 | B2 | 10/2010 | Rose | |
| 8,532,611 | B2 * | 9/2013 | Kotzin | 455/406 |
| 2003/0135784 | A1 | 7/2003 | Yamaguchi et al. | |
| 2004/0143672 | A1 | 7/2004 | Padmanabham et al. | |
| 2004/0193705 | A1 | 9/2004 | To et al. | |
| 2004/0203385 | A1 | 10/2004 | Narayanan et al. | |

(Continued)

FOREIGN PATENT DOCUMENTS

JP 2007502560 2/2007

OTHER PUBLICATIONS

Cohen, B., "Incentives Build Robustness in BitTorrent", May 22, 2003, In Proceedings of the First Workshop on the Economics of Peer-to-Peer Systems, Berkeley, pp. 1-5.*

(Continued)

*Primary Examiner* — Douglas Blair
(74) *Attorney, Agent, or Firm* — Robert D. Shedd; Jeffrey M. Navon

(57) ABSTRACT

A method and system for live streaming in a peer-to-peer network are described including determining peer entitled and excess degree, identifying and contacting a potential parent peer and executing a contribution aware connection policy.

28 Claims, 16 Drawing Sheets

(56) References Cited

U.S. PATENT DOCUMENTS

| | | | |
|---|---|---|---|
| 2005/0273511 A1* | 12/2005 | Ferreira de Andrade et al. | 709/227 |
| 2007/0026857 A1* | 2/2007 | Kotzin | 455/426.1 |
| 2007/0091809 A1 | 4/2007 | Smith | |
| 2008/0140853 A1* | 6/2008 | Harrison | 709/231 |
| 2010/0011103 A1* | 1/2010 | Luzzatti et al. | 709/226 |
| 2011/0202679 A1* | 8/2011 | Cohen et al. | 709/238 |

OTHER PUBLICATIONS

Sung et al.: "Enabling Contribution Awareness in an Overlay Broadcasting System," SIGCOMM 2006 Proceedings, Sep. 14, 2006, pp. 411-422, XP002444977.

Magharei et al.: "Understanding Mesh-based Peer-To-Peer Streaming," Proceedings of the International Workshop on Network and Operating Systems Support for Digital Audio and Video, May 2006, New Port, Rhode Island, XP002444978.

International Search Report, dated Aug. 13, 2007.

Kawai et al., "A Time-Based Appraising Method in Cached Peer-to-Peer Networks", The Institute of Eiectronics, Information and Communication Engineers, IEICE Technical Report CST2005-51, Jan. 2006.

Habib et al., "Incentive Mechanism for Peer-to-Peer Media Streaming," Proceedings of 2004 12th IEEE International Workshop on Quality of Service, Jun. 7, 2004, pp. 171-180.

Mueller et al., "Analysis of a distributed algorithm to determine multiple routes with path diversity in AD Hoc Networks," WIOPT 2005, 3rd Int'l Symposium, Apr. 7, 2005, pp. 277-285.

Shimizu et al., "Design of Incentive Mechanism for Constructing Minimum Delay Multicast Among Selfish End Users", Information Processing Society of Japan, IPSJ SIG Technical Report, vol. 2006, No. 96, Sep. 15, 2006, pp. 55-60.

Dow et al., "A Reliable Multicast Routing Protocol Based on Recovery Points in Mobile AD-HOC Networks," 2005 2nd Int'l Conf on Mobile Tech, Applns and Systems, Nov. 17, 2005, pp. 1-7.

* cited by examiner

CONTRIBUTION AWARE PEER-TO-PEER LIVE STREAMING SERVICE

This application is a National Stage Application and claims the benefit, under 35 U.S.C. §365 of International Application PCT/US2006/045588 filed Nov. 29, 2006, which was published in accordance with PCT Article 21(2) on Jun. 5, 2008 in English.

FIELD OF THE INVENTION

The present invention relates to peer-to-peer networking in general, and specifically to incentive based live streaming over a peer-to-peer network.

BACKGROUND OF THE INVENTION

In a peer-to-peer (P2P) live streaming environment, there are two types of approaches: tree based and mesh based. Some work has been done in providing contribution aware P2P live streaming for the tree based approach. No known work has been done to provide contribution aware P2P live streaming for the mesh based approach. The mesh based approach, however, outperforms the tree based approach in terms of robustness, efficiency, etc.

In the mesh based approach to P2P live streaming, the environment is characterized by peers having constrained heterogeneous outgoing bandwidth. It is desirable to provide contribution aware P2P live streaming for a mesh based approach where the peers have constrained heterogeneous outgoing bandwidth.

SUMMARY OF THE INVENTION

Live streaming will be described herein in terms of video but can also include any type of live streaming media such as digital audio. As used herein, a "/" denotes alternative names for the same or like components. In a mesh based approach to P2P live streaming peers/users receive different levels of service proportional to their willingness to contribute to the network, where the willingness is measured by the peer's contribution of uplink bandwidth to the mesh overlay divided by the bandwidth per flow.

A peer that wants to join a P2P network is denoted herein as a joining or requesting peer. A bootstrapping node is a node that behaves as a gatekeeper. A joining peer contacts the bootstrapping node in order to join the P2P network. The bootstrapping node informs the joining peer of the total number of peers/users in the P2P network. In exchange, the joining peer advises the bootstrapping node of its willingness to contribute measured by the bandwidth the joining peer is willing to contribute to the P2P overlay/network. Using the information provided by the bootstrapping node, the joining peer calculates the number of parent peers to which it can be connected.

Each peer attempts to maintain a certain number of entitled parent peers ($r_i$) based on the status of the overlay and its own bandwidth contribution. This, in turn, determines the bandwidth and consequently the quality that a peer can receive. Each individual peer serves a specific number of other peers as children based on its willingness and the availability of child peers.

A contribution aware method and system for live streaming in a peer-to-peer network are described including computing peer entitled and excess degree, identifying and contacting a potential parent peer and executing a connection policy.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
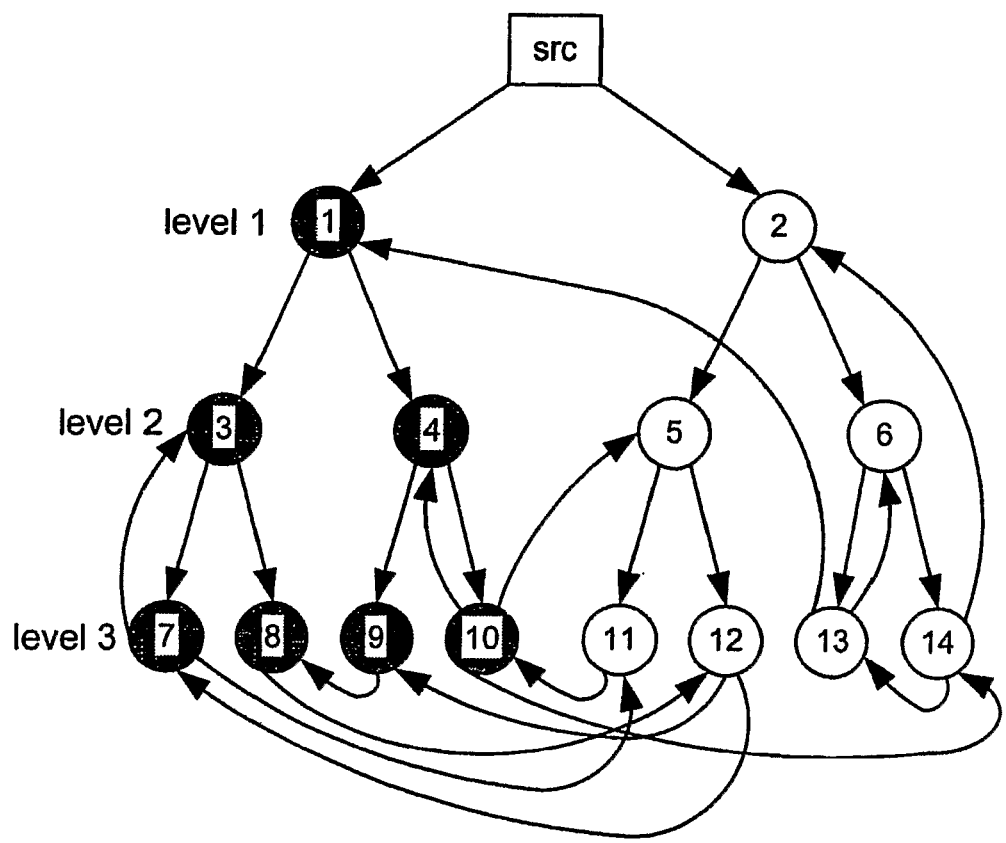
FIG. 1 is a schematic diagram of a diffusion tree.

The selection policy for distributing bandwidth among participating peers is based on the contribution of the peers in the P2P network. Assuming there are N peers and peer i's ($p_i$) willingness is $W_i$, the heuristics described herein determine the total number of entitled parent peers $r_i$ that $p_i$ can have. A generic cost function is used to determine the number of entitled parents that each peer can have:

$$r_i = \frac{1}{t} W_i + \frac{t-1}{t} \sum_{i=0}^{N} \frac{W_i}{N},$$

where $r_i$ is the entitled parent peers, N is the number of participating peers, $W_i$ is the willingness of $p_i$ and t is the cost factor. By using a cost factor greater than one, it is assured that there is extra bandwidth in the system.

The parent discovery process occurs after the number of entitled parent peers, $r_i$, is determined. Each peer should locate at least $r_i$ number of parent peers with which to connect (to form a connection). The parent discovery process should distribute the bandwidth in a fair and timely fashion. Described herein are three different approaches to enable peers to discover appropriate parent peers: centralized, distributed and semi-distributed. Also described herein is a device that can locate the appropriate parent peers for a joining/requesting peer.

Delivery of a live multimedia stream through P2P overlays is a promising approach to support one-to-many streaming over the Internet. This approach is generally referred to as P2P streaming. In P2P streaming, participating users (peers) actively contribute their resources (both bandwidth and storage space) by forwarding their available content to other peers. The aggregate available resources scale with the user/peer population and can potentially accommodate any number of participating peers.

Most of the effort in designing P2P streaming protocols has been restricted to an environment with highly provisioned resources in the system. However, some important aspects that have been largely ignored and are critical in real deployments are peers with asymmetric, heterogeneous bandwidth and insufficient resources in the overlay. The present invention addresses these issues by considering highly heterogeneous environments where hosts make unequal contributions to the overlay due to their limited outgoing bandwidth or lack of willingness. Moreover, in these environments the total resources in the system may not be sufficient for everyone to receive full quality of the stream.

It is desirable to enable peers to receive stream quality proportional to their contributions while effectively utilizing all resources in the system. These policies can better utilize bandwidth of high-bandwidth peers, offer better quality to low bandwidth peers and encourage peers to contribute more to receive higher quality. Possible methods of monitoring the overall system resources are investigated including centralized, distributed and semi-distributed.

PRIME is a live streaming technique in which each P2P streaming system consists of two major components: (i) an overlay construction, that organizes participating peers into an overlay and (ii) content delivery that determines delivery of content to individual peers through the overlay.

Participating peers form a randomly connected overlay or mesh, which is a directed graph. Each peer maintains a certain number of parent peers from which it retrieves content, and a certain number of child peers to which it delivers content. For each peer, the number of parent peers and the number of child peers are denoted as that peer's incoming and outgoing degree, respectively. To effectively utilize access link bandwidth of participating peers, the incoming and outgoing degree of each peer is set proportional to its available incoming bandwidth $b_{down}$ and outgoing bandwidth $b_{up}$. The ratio of incoming (or outgoing) bandwidth to incoming (or outgoing) degree represents the average bandwidth of each connection, which is called bandwidth-per-flow or bwpf. Bwpf is a configuration parameter that is selected a priori and known by individual peers. Specifically, the incoming and outgoing degree of a peer is set to be $b_{down}$/bwpf and $b_{up}$/bwpf, respectively.

A swarm-like content delivery mechanism is employed for content delivery. The main advantages of the swarming content delivery are its ability to effectively utilize the outgoing bandwidth of participating peers and its robustness against the dynamics of peer participations (or churn). Swarm-like content delivery incorporates push content reporting with pull content requesting. As a parent peer, each peer periodically reports its newly received packets to its child peers. As a child peer, each peer periodically requests a subset of required packets from each of its parent peers based on the reported available packet at each parent peer and the available bandwidth from each parent peer to the requesting child peer. The requested packets from each parent peer are determined by a packet scheduling algorithm. Each parent peer delivers the packets requested by each child peer through a congestion controlled mechanism such as TCP or RAP.

To accommodate the bandwidth heterogeneity among peers, the content is encoded with multiple description coding (MDC). MDC organizes the streaming content into several sub-streams where each sub-stream is independently decoded. The delivered quality to each peer is proportional with the number of independent sub-streams that it receives. MDC coding allows each peer to receive the appropriate number of sub-streams that are delivered through its access link bandwidth.

A packet scheduling algorithm should achieve the following two goals: (i) fully utilizing the available bandwidth from each parent peer; and (ii) ensuring in-time delivery of packets requested by child peers. The pattern of delivery of individual packets through the overlay mesh (the path that a packet traverses to reach from the source to each peer) depends on the collective behavior of the packet scheduling algorithm at all participating peers as well as the topology of overlay mesh. Each peer keeps track of the available bandwidth (through passive measurement) and available content at each parent peer (using periodic reports). Given this information, the scheduling algorithm is periodically invoked to determine the requested packets from each parent peer in two steps. First, the scheduler identifies new packets with the highest timestamps that have become available among parent peers during the last reporting period. These new packets are always requested by child peers from parent peers. Second, a random subset of other missing packets is requested from each parent peer to fully utilize its incoming bandwidth. To achieve load balancing, if a packet is available at more than one parent peer, it is requested from a parent that has the lowest ratio of requested packets to the total packet that can be served by the parent peer.

Using the scheduling algorithm described above, each segment of the content is delivered to individual participating peers in two phases: diffusion phase and swarming phase. During the diffusion phase, each peer receives any piece of a new segment from its parent peer in the higher level (closer to the source). Therefore, pieces of a newly generated segment are progressively pulled by peers at different levels. For example, pieces of a newly generated segment are pulled by peers in level 1 after one time period ($\Delta$), and then pulled by peers to level 2 after 2*$\Delta$ and so on. After d time periods, all peers in the overlay have one piece of the new segment. Ideally, each piece of a segment is delivered only once by the source. Therefore, the group of peers that receive a piece of the segment during the diffusion phase form a tree that is rooted in a peer in level 1 and is called the diffusion tree. Shaded nodes in FIG. 1 form a diffusion tree. All connections from peers in level i to their child peers in level i+1 are called diffusion connections. These connections are located on a diffusion tree.

During the swarming phase, each peer receives all the missing pieces of a segment from its parent peer in the same or lower levels (farther from source). These parent peers are called swarming parents. The swarming phase may take more than one time period since swarming parents may not have all the missing pieces of the segment. Except for the diffusion connections, all other connections in the overlay mesh are swarming connections. The collection of swarming connections forms a directed mesh that is called the swarming mesh. The swarming mesh is used to exchange different pieces of each segment between different diffusion trees.

In summary, each piece of any new segment is diffused through a particular diffusion tree during the diffusion phase of that segment. Then, the available pieces are exchanged between peers in different diffusion trees through the swarming mesh during the swarming phase for the segment.

Figure 2:
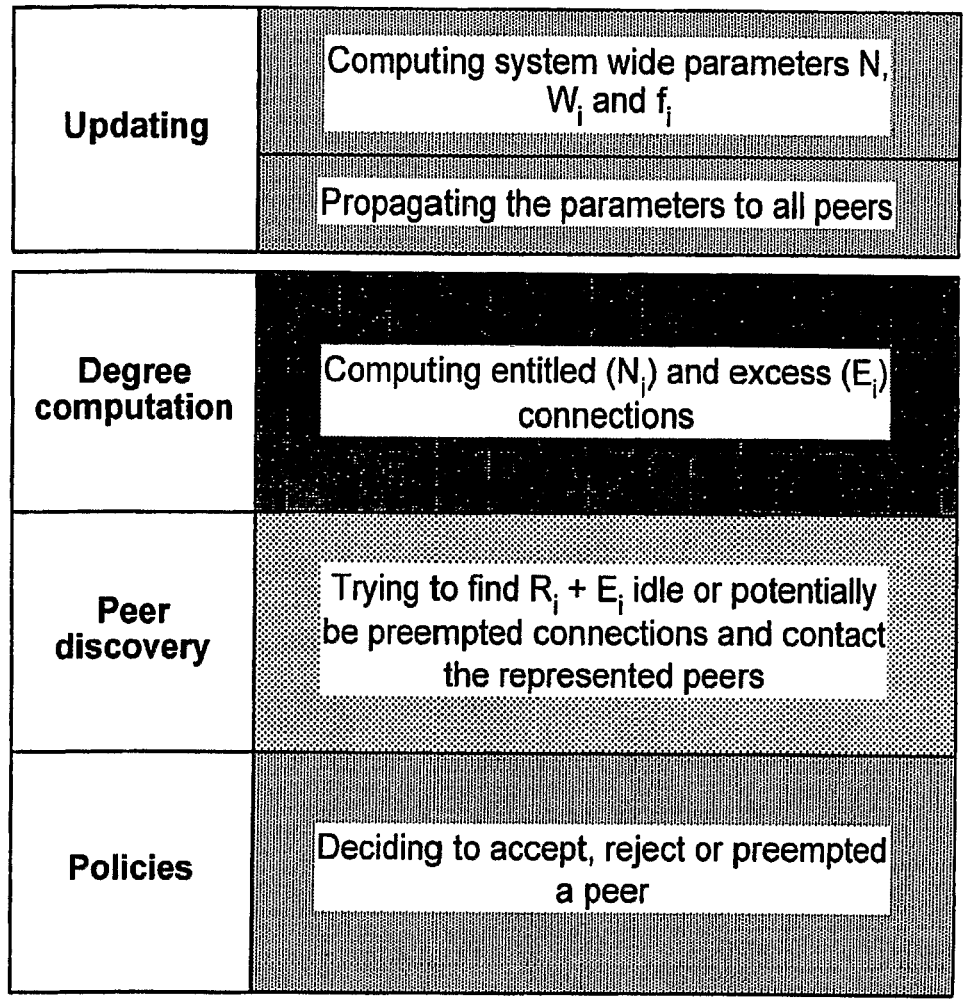
FIG. 2 shows the major primitives of the system in accordance with the present invention.

To enable peers to receive quality proportional to their contribution in the system, the P2P streaming technique described above is augmented with the following four mechanisms shown in FIG. 2.

1. System-level information updating and propagation
2. Peer entitled and excess connections computation
3. Peer discovery
4. Policies Referring to FIG. 2, the policy primitive "updating" represents the need to compute the system wide parameters N, $W_i$ and $f_i$ and propagate the parameters to all peers in the network. The entitled ($R_i$) and excess ($E_i$) incoming degree is computed for each peer in accordance with the equations given below. Through peer discovery, attempts are made to locate $R_i + E_i$ idle or parent peer with potentially preemptable child peers by contacting potential peers from the entire pool of peers in the distributed peer discovery approach or a set/list/queue of peers selected by the bootstrap node in the centralized peer discovery approach. Finally, once a potential peer is located but already connected, using Table 2 to determine if a child of the potential peer is preemptable. If a child is preemptable, then preempting the child peer.

The system-level parameters need to be updated and propagated over the course of live streaming. These parameters include N, $W_i$ and $f_i$, as defined in Table 1. Upon arrival, the joining peer contacts the bootstrapping node and informs the boot-strapping node of its willingness to serve other peers ($W_i$). The boot-strapping node has the information of the total number of peers in the system, N, and the aggregated willingness of all peers, $\Sigma(W_i)$. When a peer departs, it should contact the bootstrapping node again and un-register from the overlay. A peer may not un-register from the overlay if there is a crash or other fatal condition. Otherwise, the exiting peer should advise the bootstrapping node of its departure from the overlay.

TABLE 1

Definition of Important Symbols

| Symbol | Definition |
| --- | --- |
| N | total number of peers in the system |
| $W_i$ | the willingness of $p_i$, measured by degree, i.e, its bandwidth contribution to the overlay divided by bandwidth-per-flow, bwpf |
| $f_i$ | actual contribution (outgoing degree) of peer i |
| $R_i$ | computed entitled incoming degree of $p_i$ |
| $E_i$ | computed excess incoming degree of peer i |
| $r_i$ | actual entitled incoming degree of peer i |
| $e_i$ | actual excess incoming degree of peer i |
| Max | the number of connections required to get full quality live stream |

The actual contribution of a peer, $f_i$, varies over time. Hence the system needs to periodically refresh this information in order to compute the aggregated contribution of all peers $\Sigma(f_i)$. The computation can be performed by two methods as follows:

Centralized updating: In this approach, the peers contact the boot-strapping node whenever their actual contribution changes.

Distributed updating: In this approach, the contribution information is propagated along the diffusion tree. A peer periodically updates its parent peer in the diffusion tree regarding its current contribution plus the aggregated contribution of its descendant (child) peers (in the diffusion tree). The first-level peers will send the updates to the global boot-strapping node. In distributed updating, the value of $\Sigma(f_i)$ may not be accurate since the information is only updated periodically. However, by adjusting the length of the periodic updates, it is believed that the accuracy is sufficient.

The aggregated information of N, $\Sigma(W_i)$ and $\Sigma(f_i)$ also needs to be propagated to all peers in order for the peers to compute the number of entitled and excess incoming connections, as described below. This propagation can also be done by centralized or distributed schemes. In the centralized scheme, the boot-strapping node periodically informs all peers of the current value of N, $\Sigma(W_i)$ and $\Sigma(f_i)$. In the distributed scheme, the information is distributed through the diffusion tree, from the root (boot-strapping node) to all peers.

The entitled degree of peer i, $R_i$, is computed using the following formula:

$$R_i = \min\left\{\frac{1}{t}W_i + \frac{t-1}{t}\sum_{i=0}^{N}\frac{W_i}{N}, \text{Max}\right\},$$

where t is the parameter denoted as cost factor and $t>1$ in order to ensure extra bandwidth in the system. $R_i$ is essentially the sum of two terms. The first term represents the minimum bandwidth a peer is entitled to receive by contributing $W_i$ and the second term is the average remaining bandwidth per peer. The computed excess incoming degree of peer i is:

$$E_i = \text{Max} - R_i.$$

Once a peer computes the entitled degree, it attempts to find peers that have excess degree to support it. That is, the peer having excess degree seeks parent peers that can help the peer with excess degree make additional connection so that the peer with excess degree improves its contribution and thereby improves its quality. The peer discovery process can be done using three different approaches described below.

In centralized peer discovery, the boot-strapping node maintains a table that keeps track of every peer in the system. Each peer has one entry in the table, (id, $W_i$, $f_i$, $e_i$, $r_i$), where id is the peer id. The difference of $W_i$ and $f_i$, indicates the number of empty slots at this peer. Every peer in the system also maintains a table of all its child peers in the diffusion tree, and their corresponding parameters.

Referring now to FIG. 3, the requesting peer (peer requesting discovery of potential peers to which it can connect) sends the request to the boot-strapping node together with its parameters of $r_A$, $e_A$, $f_A$ (1). The boot-strapping node returns a list of all potential parent peers that can potentially accept the requesting peer and become its parent peer (1). A potential parent peer of the requesting peer is defined as follows:

1. If a peer has empty slots, then it is a potential parent peer.
2. If a peer (denoted as peer B) can be preempted by the requesting peer (denoted as peer A) based on the policy defined in Table 2, then peer B's parent peer is a potential peer.

TABLE 2

Policy used in determining if peer A can preempt peer B to use the
connection/slot that is currently being used by peer B at its parent node

|   | B | |
|---|---|---|
| A | Entitled | Excess |
| Entitled | Yes if $(r_A + e_A)/f_A < (r_B + e_B)/f_B$ | Yes |
| Excess | No | Yes If $(e_A)/f_A < (e_B)/f_B$ |

Examples of how to use Table 2 to determine if the current connection is preemptable are as follows. Assume that peer B is already connected to a particular parent peer. In the first instance both peer a ($p_a$) and peer b ($p_a$) have entitled degree. The actual contribution (outgoing degree) of $p_a$ is $f_a$. The actual entitled incoming degree of $p_a$ is $r_a$. The actual excess incoming degree of $p_a$ is $e_a$. Similarly for $p_b$. If $f_a=20$, $r_a=2$ and $e_a=0$, then $(r_a+e_a)/f_a=2/20=1/10$. If $f_b=20$, $r_b=5$ and $e_b=0$, then $(r_b+e_b)/f_b=5/20=1/4$. Since the calculation for $p_a<p_b$, $p_a$ can preempt $p_b$. In the second instance, $p_a$ has entitled degree and $p_b$ has excess degree. Using the same values for the parameters of $p_a$, $p_a$ once again has a calculated value for $(r_a+e_a)/f_a=2/20=1/10$. If $f_b=5$, $r_b=2$ and $e_b=1$, then $(r_b+e_b)/f_b=3/5$. Once again since the calculation for $p_a<p_b$, $p_b$ can preempt $p_a$. In the third instance, $p_a$ has excess degree and $p_b$ is entitled. In this case $p_a$ cannot preempt $p_b$. In the fourth instance, both $p_a$ and $p_b$ have excess degree. If $f_a=5$, $r_a=2$ and $e_a=0$ then $e_a/f_a=0/5=0$. If $f_b=5$, $r_b=2$ and $e_b=2$, then $e_b/f_b=2/5$ so $p_a$ can preempt $p_b$ since the ratio $e_a/f_a$ is less than the ratio $e_b/f_b$. It should be noted that $r_a$ and $r_b$ are not used in this instance.

Once the requesting peer receives the list from the bootstrapping node (2), it contacts the peers in the list sequentially (2). If the contacted peer has empty slots, it will admit the requesting peer and the peer becomes the child of this contacted peer. If the contacted peer does not have empty slots, the policy as set forth in Table 2 is used to determine if the requesting peer can preempt one of the contacted peer's child peers. If the requesting peer can preempt on of the contacted child peers then the contacted peer disconnects the child peer that is selected to be preempted and assigns the connection/slot to the requesting peer. Otherwise, the requesting peer is informed that it cannot be admitted. Although all peers in the returned list are potential parent peers, they may not be able to admit the requesting peer due to the following reasons:

1. The parameters maintained at the boot-strapping node may not be up-to-date due to the delay between the state change and the time the parameter is updated.
2. The values of $r_A$, $e_A$, $f_A$ change over the time as the requesting node obtains more parent peers.

The process of contacting the peers in the list continues until either the requesting peer obtains required number of peers or the list is exhausted. In the latter case, the requesting peer will sleep for a period of time of T and initiate the process described above again.

Figure 3A:
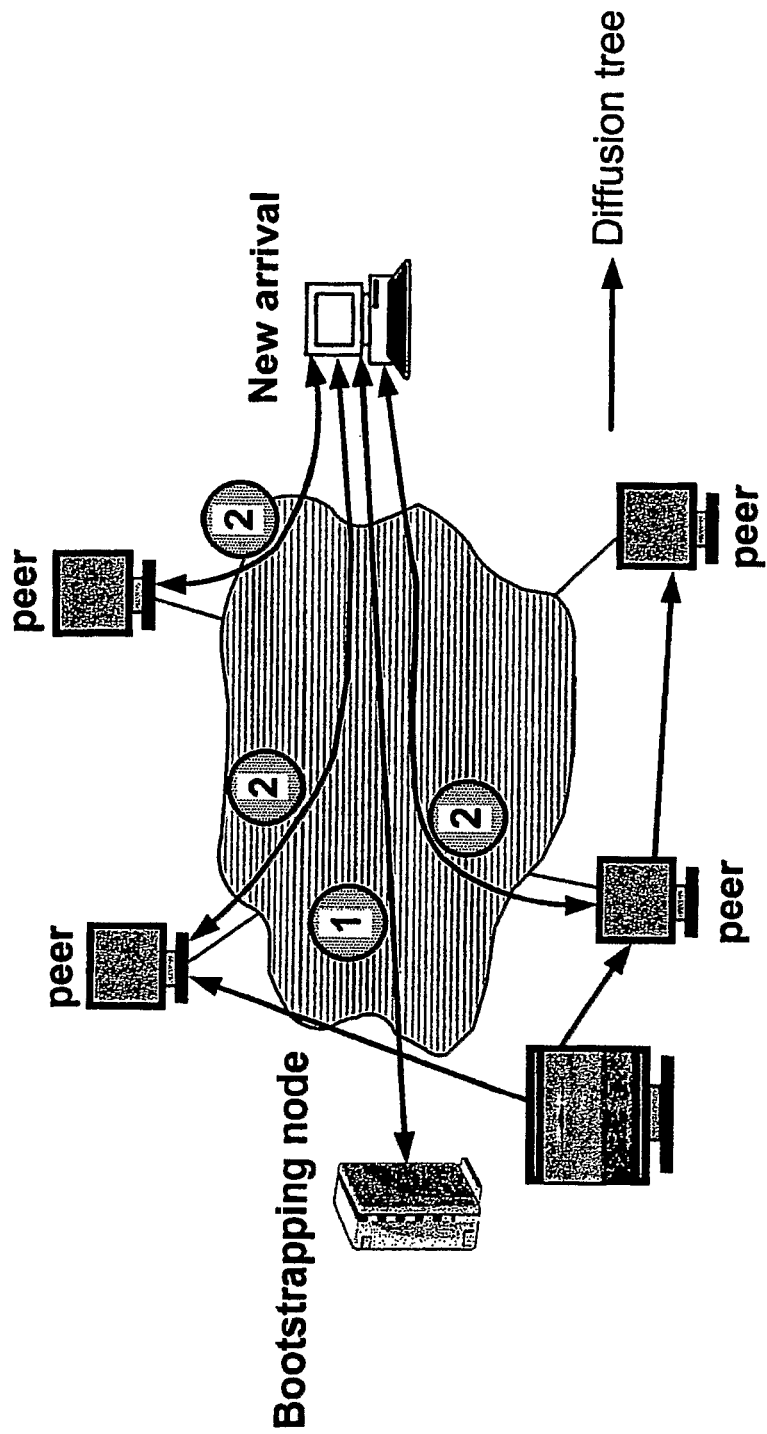
FIG. 3A is a schematic diagram of the centralized method of peer discovery.
Figure 3B:
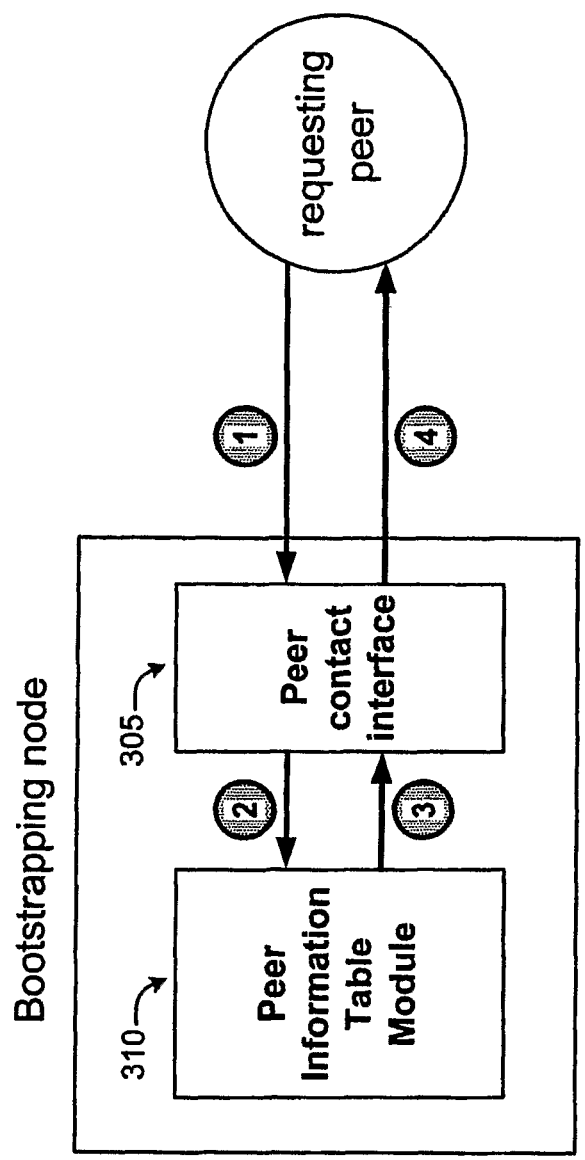
FIG. 3B is a block diagram of the communication between a requesting peer and the bootstrapping node in the centralized peer discovery method.

FIG. 3B is a block diagram of the communication between a requesting peer and the bootstrapping node in the centralized peer discovery method. For each peer there is one entry in the peer information table (id, $W_i$, $f_i$, $e_i$, $r_i$). The requesting peer send a join request to the peer contact interface 305 in the bootstrapping node (1). The peer contact interface 305 then forwards a lookup request to the peer information table module 310 (2). The peer information table module 310 performs the lookup operation on the peer information table and returns a list of potential parent peer list to the peer contact interface 305 (3). The peer contact interface 305 then returns the list containing the peer information requested to the requesting peer.

Figure 3C:
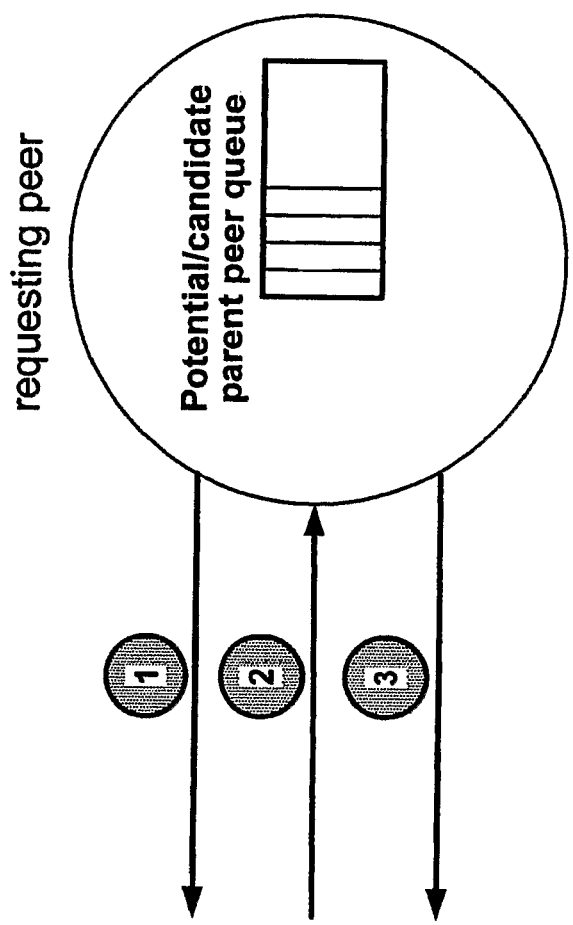
FIG. 3C is a schematic diagram of the detailed operation of the requesting peer of FIG. 3B.

FIG. 3C is a schematic diagram of the detailed operation of the requesting peer of FIG. 3B. The requesting peer contacts the bootstrapping node with a join request (1). The bootstrapping node returns a list of potential parent peers (2). The requesting peer enters the list of potential parent peers into a potential/candidate parent peer queue. The requesting peer then takes each potential parent peer from the queue sequentially and contacts the potential parent peer to see if the requesting peer can be admitted and thus, become its (or one of its) child peers (3).

Figure 3D:
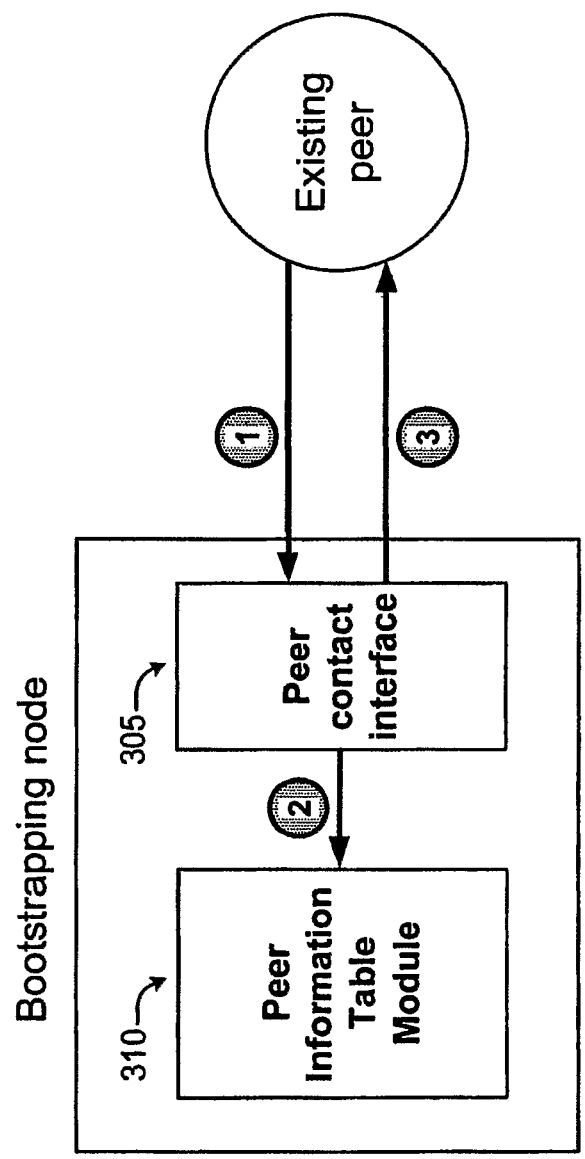
FIG. 3D is a block diagram of the communication between an existing peer and the bootstrapping node in the centralized peer discovery method.

FIG. 3D is a block diagram of the communication between an existing peer and the bootstrapping node in the centralized peer discovery method. The existing peer updates it related information with the bootstrapping node by sending an update message to the peer contact interface 305 of the bootstrapping node (1). The peer contact interface 305 forwards the update information to the peer information table module 310 (2), which updates the peer information table. The bootstrapping node returns a message to the existing peer via the peer contact interface indicating that the information has been updated (3).

Figure 3E:
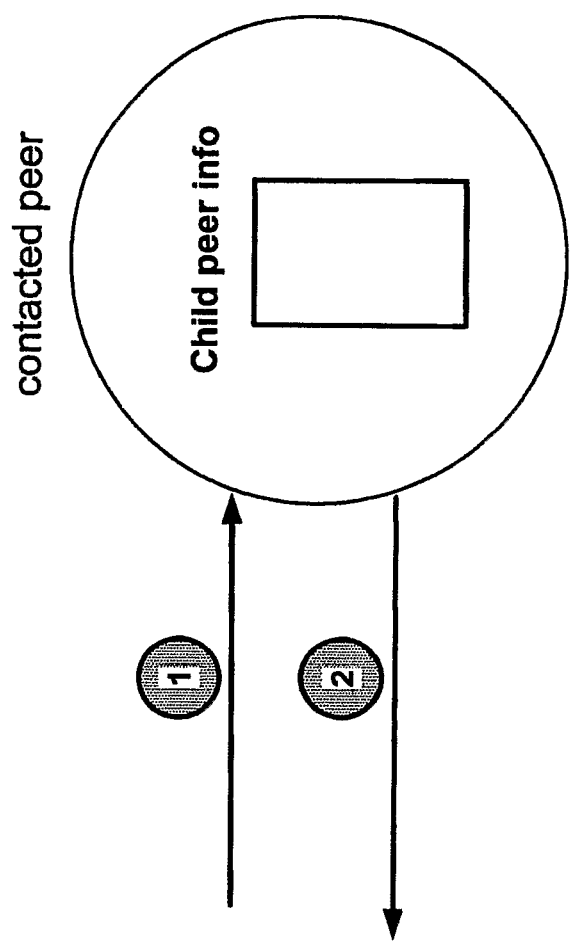
FIG. 3E is a schematic diagram of the detailed operation of the contacted peer of FIG. 3D.

FIG. 3E is a schematic diagram of the detailed operation of the contacted peer of FIG. 3D. The contacted peer (potential parent peer) receives a request from a requesting peer to join it as a child peer (1). The contacted peer examines its child peer information table and determines if the join request can be satisfied with any empty slots that it may have or by preempting one of its current child peers. The contacted peer returns a response indicating the results of its determination to the requesting peer (2).

Referring now to FIG. 4, in the distributed discovery approach, the requesting peer contacts the boot-strapping node first (1). The boot-strapping node returns the address/location of the content source node (1), which is at the root of all diffusion trees. The requesting node maintains a contacting queue, and puts the content source node into the queue and the requesting peer contacts the source node first (2), which returns its child list to the requesting peer (2). The content source node and all peers in the system maintain a table of their child peers in the diffusion tree and their corresponding parameters.

The requesting peer takes one potential parent peer out of the queue each time, and contacts this potential parent peer to see if it can be admitted (3). Each contacted peer returns its child peer list (4). The admission is based on the same policy as described above. If the contacted peer has empty slots, it will admit the requesting peer and the requesting peer becomes the child of this contacted peer, which returns its child peer list to the requesting peer (4). The requesting peer continues in this manner, contacting peers farther down the diffusion tree (5) and subsequently the children of each contacted peer where the requesting peer was admitted (6) until the required number of peers to which the requesting peer can connect are obtained or the list and peers have been exhausted. If the contacted peer does not have empty slots, the policy as set forth in Table 2 is used to determine if the requesting peer can preempt one of the contacted peer's child peers. If the requesting peer can preempt on of the contacted child peers then the contacted peer disconnects the child peer that is selected to be preempted and assigns the connection/slot to the requesting peer. Otherwise, the requesting peer is informed that it cannot be admitted. The contacted peer will also return a list of its child peers in the diffusion tree to the requesting peer at the end of process. The requesting peer attaches the returned list to the end of contacting queue. The process continues until either the requesting peer obtains the required number of peers or the list is exhausted. In the latter case, the requesting peer will sleep for a period of time of T and initiate the process described above again.

A third approach is the semi-distributed approach. In order to reduce the signaling overhead, peers maintain some local information about their two-hop away parent peers. Each parent peer piggybacks in content packets the information of its number of empty slots $W_i$, actual contribution $f_i$, and number of excess connections $e_i$ to its child peers. Further, a parent peer also sends its parent peer's information ($W_j$, $f_j$, $e_j$) to its child peers. Hence a node has the information of its parent peers and grandparent peers.

Figure 4A:
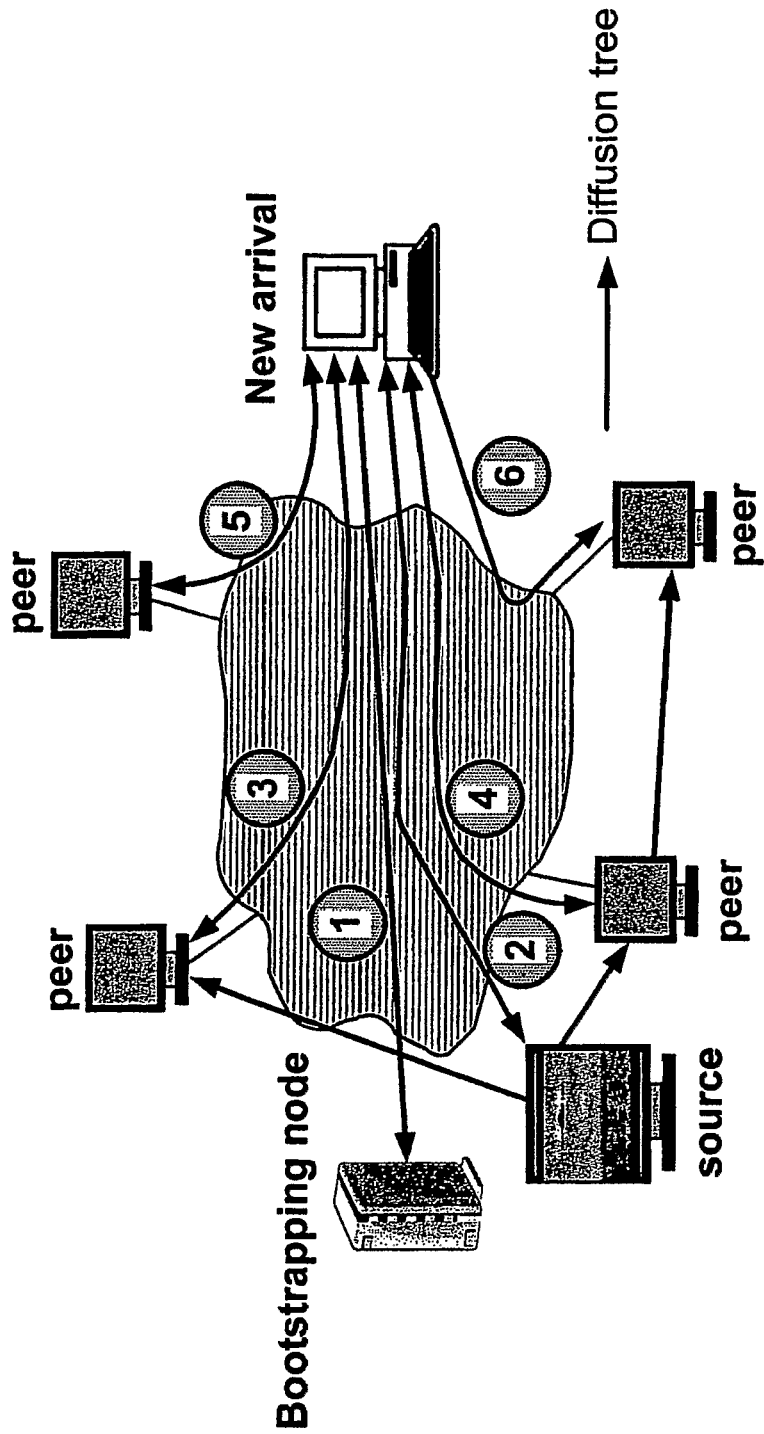
FIG. 4A is a schematic diagram of the distributed method of peer discovery.
Figure 4B:
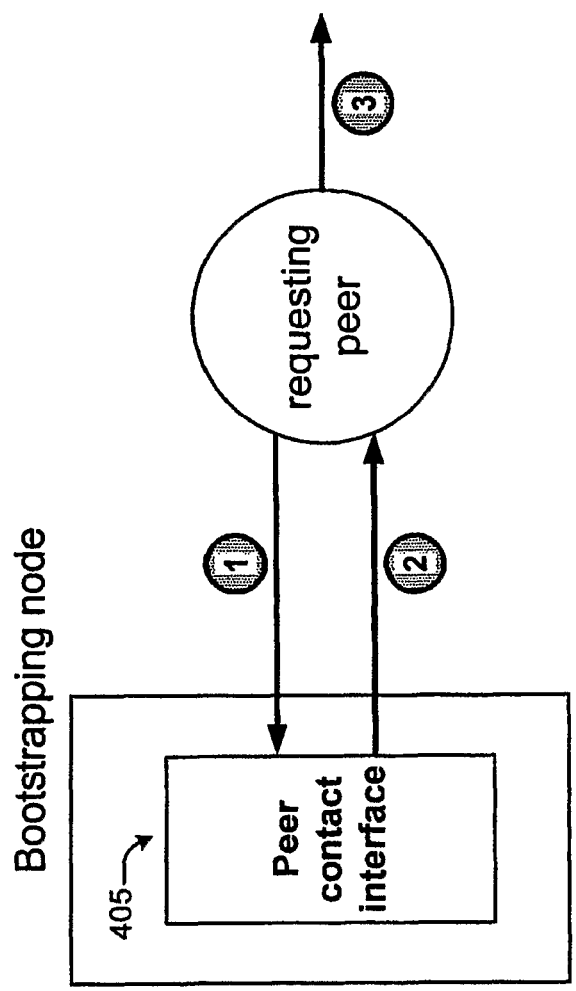
FIG. 4B is a block diagram of the communication between a requesting peer and the bootstrapping node in the distributed peer discovery method.

FIG. 4B is a block diagram of the communication between a requesting peer and the bootstrapping node in the distributed peer discovery method. The requesting peer sends a join request to the peer contact interface 405 of the bootstrapping node (1). The bootstrapping node returns the address/location of the content source node (2). The requesting peer contacts the content source node (3).

Figure 4C:
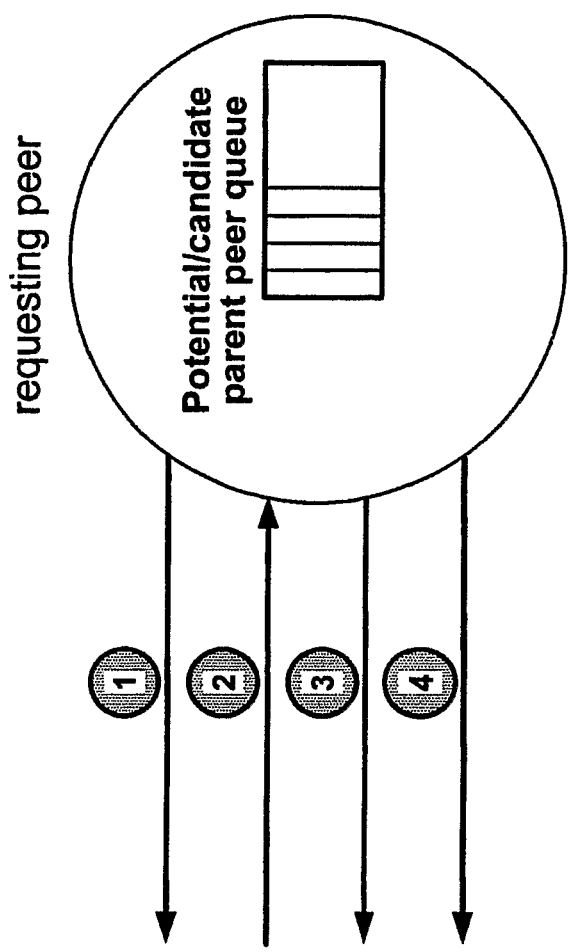
FIG. 4C is a schematic diagram of the detailed operation of the requesting peer of FIG. 4B.

FIG. 4C is a schematic diagram of the detailed operation of the requesting peer of FIG. 4B. The requesting peer contacts the bootstrapping node (1). The requesting peer receives the content source node information from the bootstrapping node (2). The requesting peer contacts the content source node and receives a list/queue of its child peers which are potential parent peers for the requesting peer (2). The requesting peer stores the returned child peer list at the end of its potential/candidate parent peer queue. The requesting peer then takes each potential parent peer entry from the potential/candidate parent peer queue and contacts it to see if the requesting peer can become its child peer (4). The contacted potential parent peer returns a list/queue of its child peers, which the requesting peer stores at the end of its potential/candidate parent peer queue.

Figure 4D:
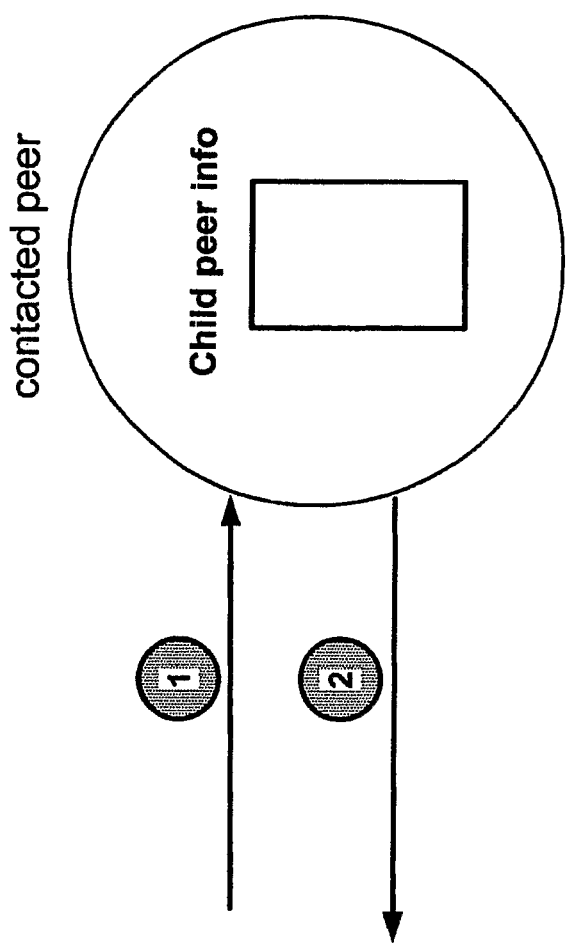
FIG. 4D is a schematic diagram of the detailed operation of the contacted peer of FIG. 4B.

FIG. 4D is a schematic diagram of the detailed operation of the contacted peer of FIG. 4B. Upon receiving the join request from the requesting peer (1), the contacted peer examines its child peer information table and determines if the join request can be satisfied with any empty slots that it may have or by preempting one of its current child peers. The contacted peer returns a response indicating the results of its determination to the requesting peer together with its child peer list (2).

Figure 5A:
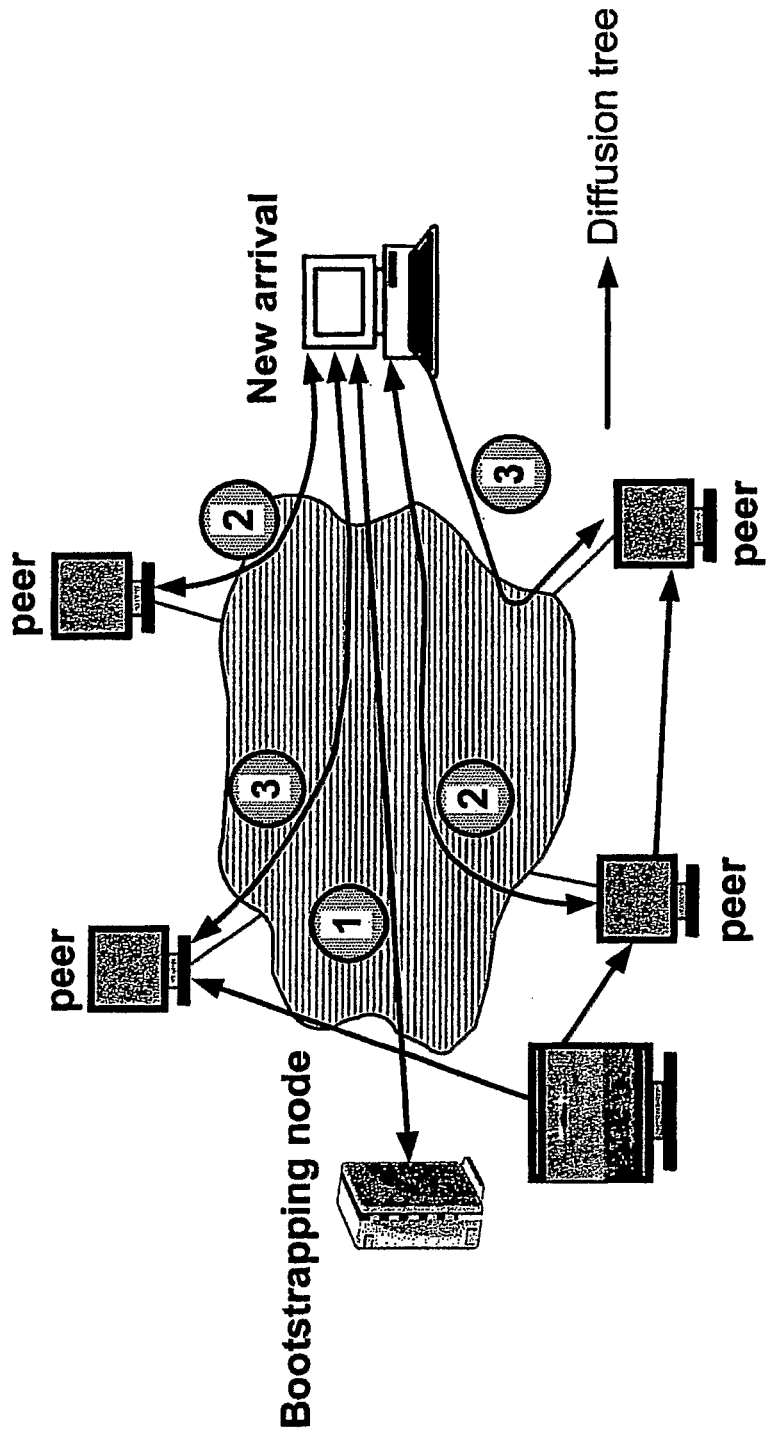
FIG. 5A is a schematic diagram of the semi-distributed method of peer discovery.

Referring now to FIG. 5A, the requesting node contacts the boot-strapping node (1) which returns a contacting queue of potential peers (1). Note that the boot-strapping node has the list of all peers in the system. However, it does not maintain the table that keeps track of each peer's parameters. The boot-strapping node randomly selects a pre-determined number of potential parent peers from the list and returns the list to the requesting node as the contacting queue.

The requesting node then contacts each peer in the list (2) and receives its neighbor list (2). All these lists are put together to form a single contacting queue. The requesting peer takes one peer off the queue each time, and contacts this potential peer to see if it can be admitted (3). The admission is based on the same policy as described above. If the contacted peer has empty slots, it will admit the requesting peer and the peer becomes the child of this contacted peer. If the contacted peer does not have empty slots, the policy as set forth in Table 2 is used to determine if the requesting peer can preempt one of the contacted peer's child peers. If the requesting peer can preempt on of the contacted child peers then the contacted peer disconnects the child peer that is selected to be preempted and assigns the connection/slot to the requesting peer. Otherwise, the requesting peer is informed that it cannot be admitted.

The process continues until either the requesting peer obtains required number of peers or the list is exhausted. In the latter case, the requesting peer will sleep for a period of time of T and initiate the process as described above again.

Figure 5B:
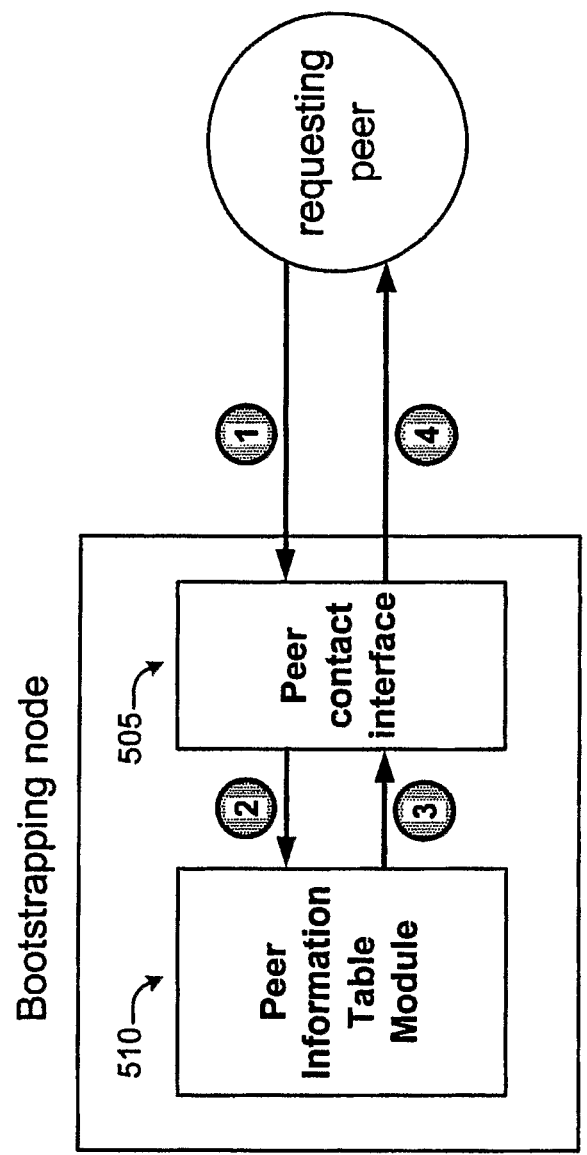
FIG. 5B is a block diagram of the communication between a requesting peer and the bootstrapping node in the semi-distributed peer discovery method.

FIG. 5B is a block diagram of the communication between a requesting peer and the bootstrapping node in the semi-distributed peer discovery method. The peer information table maintains a list of all peers in the system. The requesting peer sends a join request to the peer contact interface 505 of the bootstrapping node (1). The peer contact interface 505 then forwards a lookup request to the peer information table module 510 (2). The peer information table module 510 performs the lookup operation on the peer information table and returns a list of randomly selected potential parent peers to the peer contact interface 505 (3). The peer contact interface 505 then returns the list of randomly selected potential parent peers and their peer information to the requesting peer.

Figure 5C:
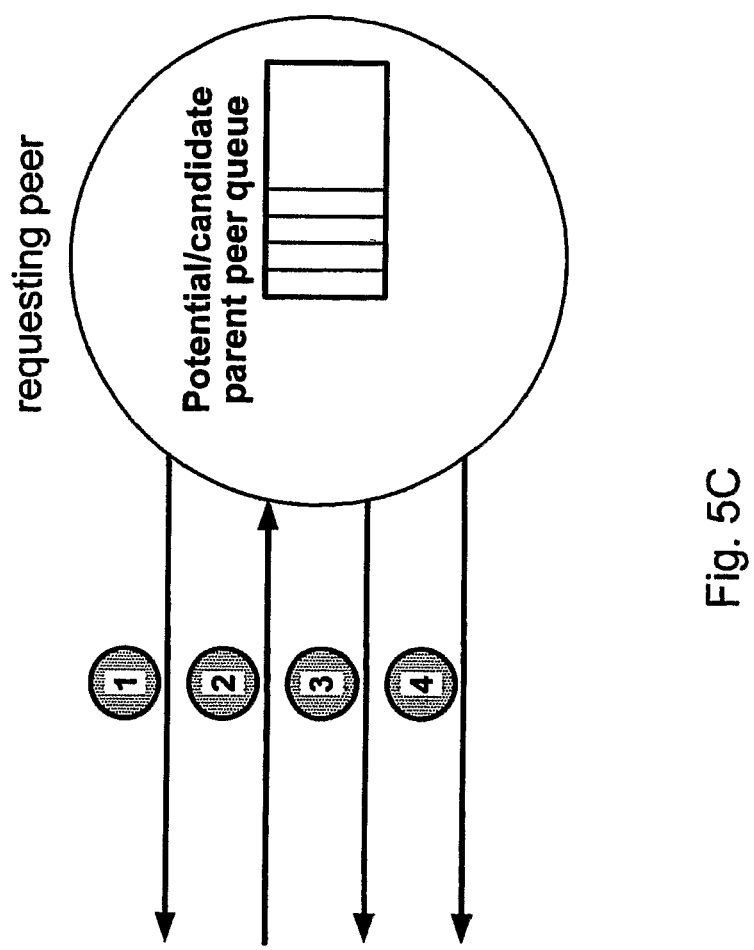
FIG. 5C is a schematic diagram of the detailed operation of the requesting peer of FIG. 5B.

FIG. 5C is a schematic diagram of the detailed operation of the requesting peer of FIG. 5B. The requesting peer contacts the bootstrapping node (1). The requesting peer receives the list of randomly selected potential parent peers (2) and stores the randomly selected potential parent peers in its potential/candidate parent peer queue. The requesting peer sequentially contacts the peers in its potential/candidate parent peer queue (3). The requesting peer then sends a message to the contacted (potential parent) peer a neighbor request message (3). Every contacted peer will return a list of its neighbor peers. The requesting peer stores the list of neighbor peers in its potential/candidate parent peer queue. The requesting peer contacts the next potential parent peer on its potential/candidate parent peer queue to see if the requesting peer can become its child peer (4).

Figure 5D:
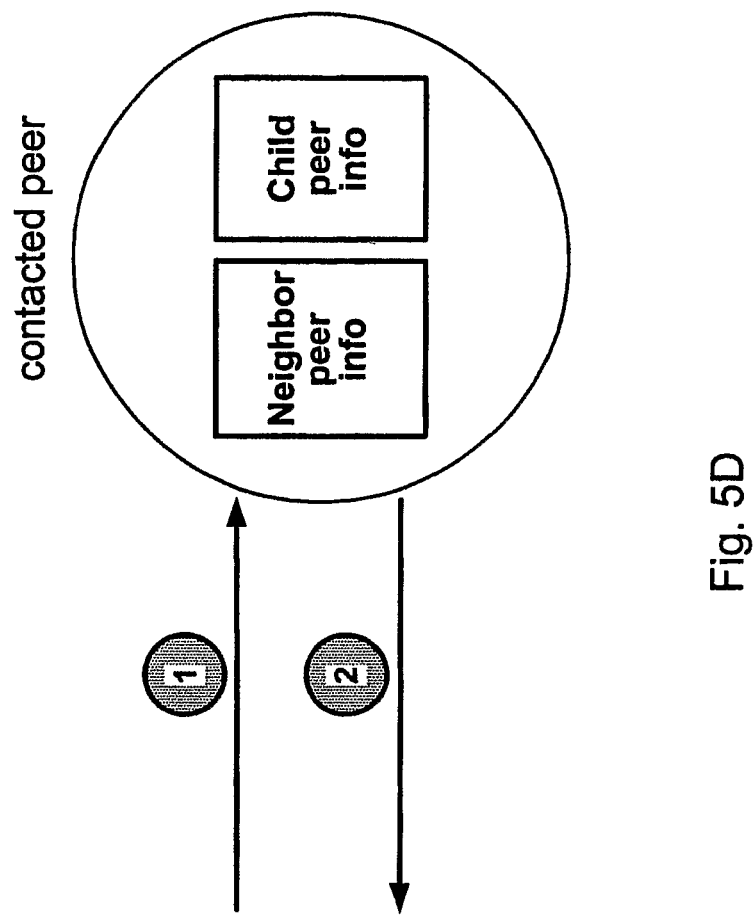
FIG. 5D is a schematic diagram of the detailed operation of the contacted peer of FIG. 5B.

FIG. 5D is a schematic diagram of the detailed operation of the contacted peer of FIG. 5B. A contacted peer, upon receiving a neighbor request message from the requesting node, returns its neighbor peer list to the requesting node (1). If the incoming message is to search for empty slots, the contacted peer examines its child peer information table and determines if the request can be satisfied with any empty slots that it may have or by preempting one of its current child peers. The contacted peer returns a response indicating the results of its determination to the requesting peer (2).

Figure 6:
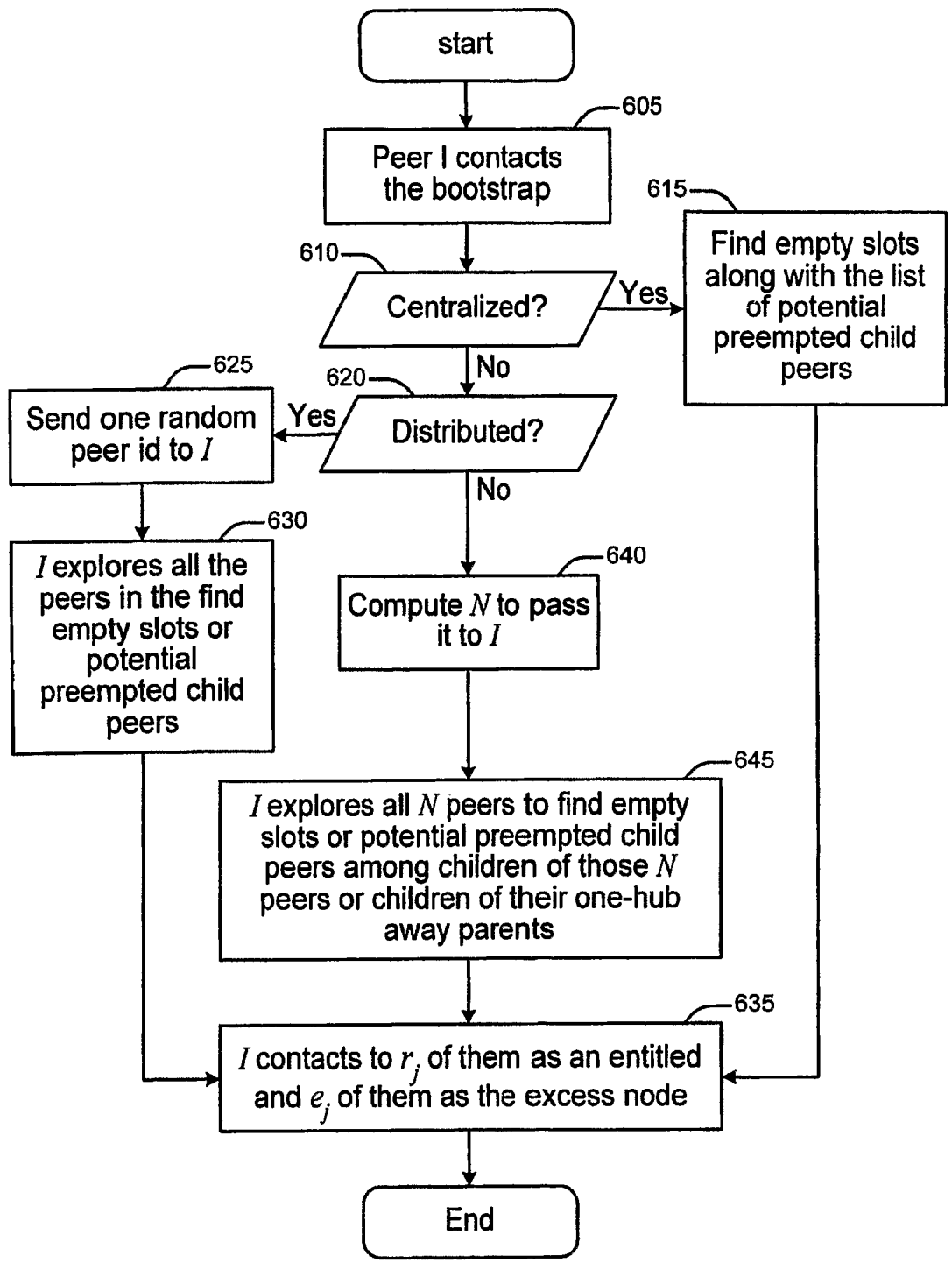
FIG. 6 is a flowchart of the peer discovery process.

Referring now to FIG. 6, which is a flowchart of the peer discovery process. At 605, $p_i$ contacts the bootstrap node. A test is performed at 610 to determine if centralized peer discovery is to be used. If centralized peer discovery is to be used then the empty slots/connections along with the list/queue of potential preemptable child peers is given to $p_i$ by the bootstrap node at 615. Then $p_i$ contacts $r_i$ of the potential peers as an entitled peer and $e_i$ of the potential peers as an excess peer at 635. If centralized peer discovery is not to be used then a test is performed at 620 to determine if distributed peer discovery is to be used. If distributed peer discovery is to be used then the identification (id) of a list/queue of random peers is given to $p_i$ at 625. At 630 $p_i$ explores all peers in the list/queue of peers with empty slots/connections and the potentially preemptable peers. Then $p_i$ contacts $r_i$ of the potential peers as an entitled peer and $e_i$ of the potential peers as an excess peer at 635. If distributed peer discovery is not to be used then by default, semi-distributed peer discovery is to be used. At 640 the number of peers in the network, N, is given to $p_i$. Then at 645 I explores all N peers to find empty slots or potentially preemptable child peers among children of those N peers or children of the potential peers that are one hop away from $p_i$.

Then $p_i$ contacts $r_i$ of the potential peers as an entitled peer and $e_i$ of the potential peers as an excess peer at 635.

Note that the present invention may have longer startup delay/latency than traditional non-contribution-aware peer-to-peer streaming schemes. The process of locating parent peers contributes to the longer startup delay. Also, different peer discovery schemes cause different latency. The centralized peer discovery and semi-distributed peer discovery schemes incur shorter startup/joining latency than the distributed peer discovery scheme, which traverses the diffusion trees starting from the root. However, since the contribution-aware peer-to-peer live streaming method of the present invention uses MDC (multiple description coding) to encode the underlying data, a peer can start the playback whenever it receives the first description. This can potentially shorten the startup latency.

The peer preemption policy can lead to extra peer churning in present invention. For instance, if a requesting peer preempts a child peer that is already connected to a parent peer, the preempted child peer has to try to join another parent peer, thus, adding extra churning to the system. This process may continue until a preempted child peer finds an empty slot for itself with another parent peer.

If a connection being preempted is "excess connection", this has less impact since the peer is not deemed to have this connection in the first place. One way to mitigate this problem is to modify the preemption policy. The preemption policy of the present invention does not allow an "entitled connection" to preempt another "entitled connection". Also, the churn effect may not be as serious since MDC (multiple description coding) is used to encode the stream data. If a peer loses some descriptions, the viewing quality will degrade, however, the stream is still viewable.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for live streaming media in a peer-to-peer network, said method comprising:
    determining, by a joining peer, its peer entitled degree and its peer excess degree; and
    executing, by said joining peer, a contribution aware connection policy, and wherein said peer-to-peer network is a mesh-based network, wherein said joining peer in said peer-to-peer network receives a level of service, for streaming media, proportional to said joining peer's contribution wherein said joining peer's contribution is determined by dividing said joining peer's uplink bandwidth by an average bandwidth per flow, wherein said method is executed in a distributed manner by said joining and further comprises:
    determining an entitled incoming degree;
    determining an excess incoming degree;
    sending a request to join message;
    receiving an address of a source;
    contacting said source;
    receiving from said source a first list of potential parent peers;
    contacting one of said potential parent peers on said first list of potential parent peers to attempt to establish a connection with said potential parent peer;
    receiving from said contacted potential parent peer a second list of potential parent peers; and
    contacting one of said potential parent peers on said second list of potential parent peers to attempt to establish a connection with said potential parent peers on said second list of potential parent peers, and wherein said bandwidth per flow represents said average bandwidth of each established connection.

2. The method according to claim 1, further comprising, updating its peer's information, by said joining peer.

3. The method according to claim 2, wherein said updating act further comprises:
    forwarding, by said joining peer, its updated peer information to a bootstrap node; and
    receiving, by said joining peer, an acknowledgement, from said bootstrap node, that its said updated peer information has been received and stored.

4. The method according to claim 1, wherein said determining act further comprises:
    determining a set of system wide parameters by bootstrap node; and
    propagating said determined set of system wide parameters, by said bootstrap node, in said peer-to-peer network.

5. The method according to claim 1, wherein said connection to said contacted potential parent peer is established if said contacted potential parent peer has empty slots.

6. The method according to claim 1, wherein said executing act further comprises determining if a child peer already connected to said contacted potential parent peer is preemptable in accordance with said connection policy.

7. The method according to claim 1, wherein said connection policy is modifiable if said connection policy results in excessive churn.

8. A method for live streaming media in a peer-to-peer network, said method comprising:
    determining, by a joining peer, its peer entitled degree and its peer excess degree by a peer; and
    executing, by said joining peer, a contribution aware connection policy, and wherein said peer-to-peer network is a mesh-based network, wherein said joining peer in said peer-to-peer network receives a level of service, for streaming media, proportional to said joining peer's contribution wherein said joining peer's contribution is determined by dividing said joining peer's uplink bandwidth by an average bandwidth per flow, wherein said method is executed in a semi-distributed manner by said joining peer and further comprises:
determining an entitled incoming degree;
determining an excess incoming degree;
sending a request to join message;
receiving a randomly selected list of potential parent peers;
contacting a potential parent peer on said randomly selected list of potential parent peers to attempt to establish a connection with said potential parent peer;
receiving from said contacted potential parent peer a second list of potential parent peers in order to receive streamed media; and
contacting one of said potential parent peers on said second list of potential parent peers to attempt to establish a connection with said potential parent peers on said second list of potential parent peers, wherein said second list of potential parent peers is a list of neighbor peers of said one of said contacted randomly selected potential peers, and wherein said bandwidth per flow represents said average bandwidth of each established connection.

9. The method according to claim 8, further comprising, updating its peer's information, by said joining peer.

10. The method according to claim 9, wherein said updating act further comprises:
forwarding, by said joining peer, its updated peer information to a bootstrap node; and
receiving, by said joining peer, an acknowledgment from said bootstrap node, that its said updated peer information has been received and stored.

11. The method according to claim 8, wherein said determining act further comprises:
determining a set of system wide parameters by a bootstrap node; and
propagating said determined set of system wide parameters, by said bootstrap node, in said peer-to-peer network.

12. The method according to claim 8, wherein said connection to said contacted potential parent peer is established if said contacted potential parent peer has empty slots.

13. The method according to claim 8, wherein said executing act further comprises determining if a child peer already connected to said contacted potential parent peer is preemptable in accordance with said connection policy.

14. The method according to claim 8, wherein said connection policy is modifiable if said connection policy results in excessive churn.

15. An apparatus for live streaming media in a peer-to-peer network, said apparatus comprising a processor, a random access memory and an input/output interface, said processor being configured to:
determine a peer entitled degree and a peer excess degree, said apparatus being a joining peer;
implement a contribution aware connection policy, and wherein said peer-to-peer network is a mesh-based network, wherein said joining peer in said peer-to-peer network receives a level of service, for streaming media, proportional to said joining peer's contribution wherein said joining peer's contribution is determined by dividing said joining peer's uplink bandwidth by an average bandwidth per flow, wherein said joining peer operates in a distributed manner;
determine an entitled incoming degree;
determine an excess incoming degree;
send a request to join message;
receive an address of a source;
contact said source;
receive from said source a first list of potential parent peers;
contact one of said potential parent peers on said first list of potential parent peers to attempt to establish a connection with said potential parent peer;
receive from said contacted potential parent peer a second list of potential parent peers; and
contact one of said potential parent peers on said second list of potential parent peers to attempt to establish a connection with said potential parent peers on said second list of potential parent peers, and wherein said bandwidth per flow represents said average bandwidth of each established connection.

16. The apparatus according to claim 15, wherein the processor is further configured to update its peer's information, by said joining peer.

17. The apparatus according to claim 16, wherein said processor is configured to update by being further configured to:
forward its updated peer information to a bootstrap node; and
receive an acknowledgement, from said bootstrap node, that its said updated peer information has been received and stored.

18. The apparatus according to claim 15, wherein said processor is configured to determine by being further configured to:
determine a set of system wide parameters by a bootstrap node; and
propagate said determined set of system wide parameters, by said bootstrap node, in said peer-to-peer network.

19. The apparatus according to claim 15, wherein said connection to said contacted potential parent peer is established if said contacted potential parent peer has empty slots.

20. The apparatus according to claim 15, wherein said processor is configured to execute by being further configured to:
determine if a child peer already connected to said contacted potential parent peer is preemptable in accordance with said connection policy.

21. The apparatus according to claim 15, wherein said connection policy is modifiable if said connection policy results in excessive churn.

22. An apparatus for live streaming media in a peer-to-peer network, said apparatus comprising a processor, a random access memory and an input/output interface, said processor being configured to perform the steps of:
determine a peer entitled degree and a peer excess degree, said apparatus being a joining peer;
implement a contribution aware connection policy, and wherein said peer-to-peer network is a mesh-based network, wherein said joining peer in said peer-to-peer network receives a level of service, for streaming media, proportional to said joining peer's contribution wherein said joining peer's contribution is determined by dividing said joining peer's uplink bandwidth by an average bandwidth per flow, wherein said joining peer operates in a semi-distributed manner;
determine an entitled incoming degree;
determine an excess incoming degree;
send a request to join message;
receive a randomly selected list of potential parent peers;
contact a potential parent peer on said randomly selected list of potential parent peers to attempt to establish a connection with said potential parent peer;
receive from said contacted potential parent peer a second list of potential parent peers in order to receive streamed media; and contact one of said potential parent peers on said second list of potential parent peers to attempt to establish a connection with said potential parent peers on said second list of potential parent peers, wherein said second list of potential parent peers is a list of neighbor peers of said one of said contacted randomly selected potential peers, and wherein said bandwidth per flow represents said average bandwidth of each established connection.

23. The apparatus according to claim 22, wherein the processor is further configured to update its peer's information, by said joining peer.

24. The apparatus according to claim 23, wherein said processor is configured to update by being further configured to:
   forward its updated peer information to a bootstrap node; and
   receive an acknowledgement from said bootstrap node, that its said updated peer information has been received and stored.

25. The apparatus according to claim 22, wherein said processor is configured to determine by being further configured to:
   determine a set of system wide parameters by a bootstrap node; and
   propagate said determined set of system wide parameters, by said bootstrap node, in said peer-to-peer network.

26. The apparatus according to claim 22, wherein said connection to said contacted potential parent peer is established if said contacted potential parent peer has empty slots.

27. The apparatus according to claim 22, wherein said processor is configured to execute by being further configured to:
   determine if a child peer already connected to said contacted potential parent peer is preemptable in accordance with said connection policy.

28. The apparatus according to claim 22, wherein said connection policy is modifiable if said connection policy results in excessive churn.

* * * * *